(No Model.)
J. V. REAMS.
HOSE COUPLING.
No. 540,689. Patented June 11, 1895.
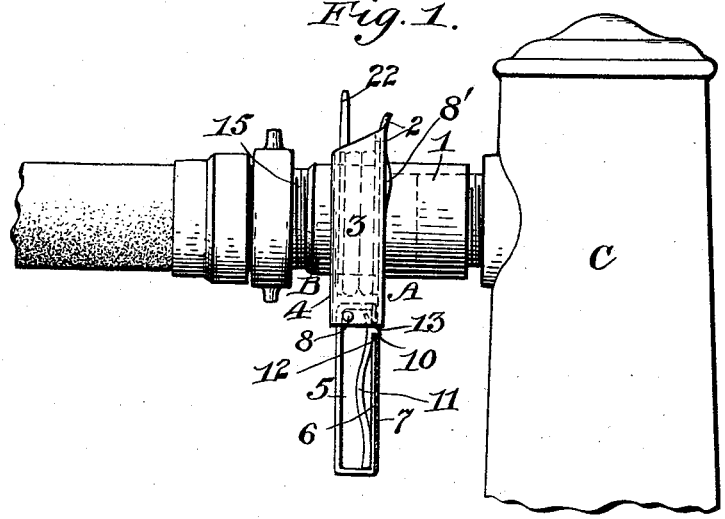
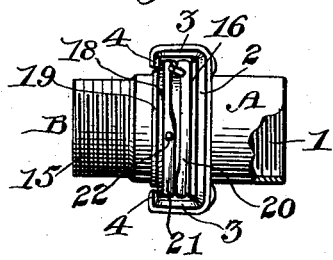
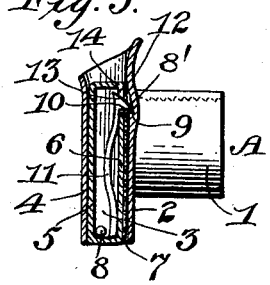
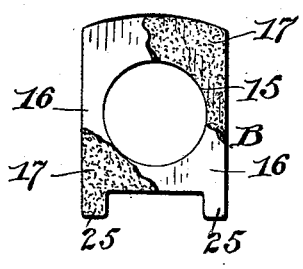
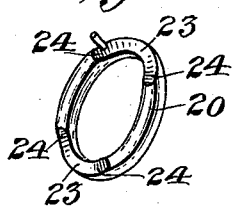
WITNESSES
Severance
W. Harry Muzzy
INVENTOR
John V. Reams
By Angeline P. Lawyer
Asso. Attorney.
THE NORRIS PETERS CO., PHOTO-LITHO., WASHINGTON, D. C.

UNITED STATES PATENT OFFICE.

JOHN V. REAMS, OF EDENVILLE, MICHIGAN, ASSIGNOR OF ONE-HALF TO ELMER A. ANNES, OF SAME PLACE.

HOSE-COUPLING.

SPECIFICATION forming part of Letters Patent No. 540,689, dated June 11, 1895.

Application filed January 18, 1895. Serial No. 535,384. (No model.)

*To all whom it may concern:*

Be it known that I, JOHN V. REAMS, a citizen of the United States, residing at Edenville, in the county of Midland and State of Michigan, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in hose couplings, whereby a hose or section of pipe may be easily and rapidly connected or disconnected with a stand pipe, hydrant, fire plug or another hose or section of pipe, &c., the communication between the interior of the two parts being made or broken by the mere joining of the parts together, and for this purpose my invention consists in the construction, arrangements and combination of the several parts of which it is composed as will be hereinafter more fully described and claimed.

Referring to the accompanying drawings, in which corresponding parts are designated by similar marks of reference, Figure 1 is a side elevation of a pipe connected up with my improved coupling. Fig. 2 is a plan view of a detached coupling, the parts being shown as seated together. Fig. 3 is a side elevation of that member of the coupling which is provided with the gate, one of the sides being broken away for the purpose of better illustration. Fig. 4 is an end elevation of the opposite member of the coupling. Fig. 5 is a perspective view of one of the cam-rings.

The one member A of the coupling which is shown in the annexed drawings as being connected to the water plug C, although it is obvious that it may be connected to any other conduit, consists of a threaded cylinder 1 for forming the connection with the said conduit, the said cylinder carrying upon its outer end a plate 2, the sides of which are bent forwardly at right angles to the body of the plate as at 3, 3 to an equal distance, the forward edges of said sides being bent inwardly and toward each other, as at 4, 4, the said sides 3, 3 and inward prolongations 4, 4, forming guides upon the forward face of the plate 2, which are adapted to receive the rectangular frame 5. This frame corresponds in its general shape to the forward face of the plate 2, and sliding in the guides, serves when raised, to close the forward end of the central aperture of the cylinder 1, the said aperture extending through the plate 2 and being closed by the rear plate 6 of the frame 5, upon which rear plate suitable packing material is secured in the form of a sheet 7, in order that when the frame 5 is raised within the guides, the forward end of the central aperture of the cylinder 1 may be closed water-tight. The movement of the frame 5 within the guides is limited by means of the transverse rod 8, which by engagement with the top and bottom of the frame 5, limits its movement downwardly and upwardly, the said rod extending from the bottom of the one side 3 to the opposite side.

In order to maintain the frame 5 in its raised position (in which position it closes the mouth of the cylinder 1) and in order to prevent the unauthorized movement of the frame by mischievously disposed persons, recesses 8' are formed in the plate 2, forming upwardly facing square shoulders 9, with which oppositely placed shoulders 10, resiliently connected with the frame 5 engage. As many of these shoulders 9 and 10 may be used as desired, and may, if desired, be irregularly placed at different heights, in order to render the key necessary to actuate them more or less complicated, irregular and hard to imitate.

As shown, the shoulders 10 connect with the frame 5, by being mounted upon springs 11, secured to the bottom of the frame, the said springs forcing the shoulders 10 into engagement with the shoulders 9 upon the plate 2, through apertures 12, formed in the rear plate 6 for that purpose. Each of these shoulders 10 has formed above it a rearwardly and downwardly inclined face 13, while above such shoulders the top plate of the frame 5 is apertured at 14 to permit the introduction of the several necessary tongues upon the key as will be hereinafter more fully described.

The opposite member B of the coupling, consists of a threaded cylinder 15, adapted to be secured to the opposite section of hose or pipes, and has upon its rear end a plate 16 which, for reasons that will hereinafter appear, I shall call the key plate, the said plate having an aperture therein, in alignment with the central aperture of the cylinder 15, and being of such size as to move readily between the cheeks or sides 3 of the plate 2, and if desired, such key plate may have a sheet 17 of suitable packing secured to its rear face. A collar 18 surrounds the cylinder 15, being of such a size that when inserted within the guides of the plate 2, it will bear upon the rear faces of the inwardly extended portions 4, 4 thereof, the collar being limited in its movement upon the cylinder 15 by the annular shoulder 19 formed thereon. Encircling the cylinder 15, and between the collar 18 and the plate 16, are two cam rings, the one ring 20 being fixed and the other ring 21 being provided with a handle 22, whereby it may be rotated upon the cylinder. These cam rings are similar in contour and, as seen in Fig. 5, in which the cam ring 20 is shown, each consists of a circular ring having alternate and equal sections of its one side cut away, as at 23, the cut away portions uniting with the raised portions by inclines 24, so that when the projection of the one ring rests within the cut-away portion of the other, the combined width of the two rings is at its minimum, while, when the movable ring is rotated in respect to the fixed ring, their combined width will be increased. It will thus be seen that if the plate 16 and collar 18 be placed within the guides of the plate 2, and the movable ring rotated, that the collar will be forced against the rear surfaces of the inwardly extending prolongations 4, 4, and the plate 16, with its packing material be forced against the plate 2, while the apertures in the cylinders 1 and 15 will be in alignment, forming a water-tight connection between the two cylinders.

In order to facilitate and permit the disengagement of the shoulders 9 and 10, which is necessary before the frame 5 can be slid down in the guides and the plate 16 inserted therein, I form upon the bottom of the plate 16 a series of tongues 25, so situated and shaped as to be of the proper contour that by their lower ends bearing upon the inclined faces 13, they will force the shoulders 10 forwardly and out of engagement with the shoulders 9. Thus when it is desired to couple a hose provided with my invention, the part B is placed above the part A, the tongues 25 upon the former extending through the apertures 14. If the part B be now pressed down, the shoulders will be liberated and the part B will shove the frame 5 downwardly within the guides and follow it. When the part B has been fully seated therein, the movable ring 21 is rotated to form a water-tight joint. When it is desired to uncouple, the movable ring is restored to its normal position and the frame 5 is raised, forcing the part B out, it being automatically locked by the shoulders 9 and 10 upon reaching the limit of its upward movement.

Having thus described my invention, what I claim, and desire to secure by Letters Patent of the United States, is—

1. In a hose coupling, the combination with the two members thereof, of a sliding gate mounted upon one member of the said coupling, of a spring lock therefor, and a plate upon the opposite member, provided with means for unlocking the said gate, substantially as described.

2. In a hose coupling, the combination with the two members thereof, of an apertured plate provided with guides forming a part of one member, a gate sliding in the said guides, a spring lock securing the said gate and plate together, and a plate mounted on the opposite member adapted to be inserted in the said guides and provided with means to actuate the spring locking mechanism, substantially as described.

3. In a hose coupling, the combination with the two members thereof, of an apertured plate provided with guides forming a part of one member, a gate sliding in the said guides, a spring lock securing the said gate and plate together, a plate mounted on the opposite member adapted to be inserted in the said guides, and provided with means to actuate the spring locking mechanism, and a cam whereby the two plates are drawn together, substantially as described.

4. In a hose coupling, the combination with a hollow cylinder, having a plate provided with guides upon its one end, a gate sliding in the said guides, a spring lock securing the said gate and plate together, a plate adapted to be inserted in the said guides, and provided with means to actuate the spring locking mechanism, a cylinder secured to the said last named plate, and a fixed and movable cam ring on the said cylinder, and adapted to be inserted in the guides with the said last named plate, substantially as described.

5. In a hose coupling consisting of two members, the combination with a hollow cylinder, having a plate provided with guides, a gate sliding in the said guides, shoulders resiliently connected with the said gate adapted to engage the said plate, and provided with inclined faces, the said parts forming one of the members of the said coupling, a second hollow cylinder provided with a plate upon one end, having projections adapted to engage the inclined faces of the shoulders, and a fixed and movable cam ring surrounding the last named cylinder, the said last named parts forming the opposite member of the coupling, the plate and cam rings of the last named member of the coupling being adapted to be inserted in the guides of the first member of the coupling to form a joint, substantially as described.

6. In a hose coupling consisting of two members, the combination with a hollow cylinder, having a plate provided with guides, a gate sliding in the said guides, the said parts forming one of the members of the said coupling, a second hollow cylinder provided with a plate upon one end, and a fixed and movable cam ring surrounding the last named cylinder, the said last named parts forming the opposite member of the coupling, the plate and cam rings of the last named member of the coupling being adapted to be inserted in the guides of the first member of the coupling to form a joint, substantially as described.

In testimony whereof I affix my signature in presence of two witnesses.

JOHN V. REAMS.

Witnesses:
THOMAS MOORE,
ELMER C. NOLAN.